(12) United States Patent
Tohyama et al.

(10) Patent No.: US 8,272,296 B2
(45) Date of Patent: Sep. 25, 2012

(54) SCREW FASTENER

(75) Inventors: Shinji Tohyama, Toyota (JP); Koji Tomida, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 377 days.

(21) Appl. No.: 12/741,948

(22) PCT Filed: Oct. 21, 2008

(86) PCT No.: PCT/JP2008/069028
§ 371 (c)(1),
(2), (4) Date: May 7, 2010

(87) PCT Pub. No.: WO2009/060712
PCT Pub. Date: May 14, 2009

(65) Prior Publication Data
US 2010/0242690 A1    Sep. 30, 2010

(30) Foreign Application Priority Data
Nov. 9, 2007 (JP) .................................. 2007-291997

(51) Int. Cl.
*B25B 23/10* (2006.01)
(52) U.S. Cl. ............................................ 81/57.4; 81/54
(58) Field of Classification Search .................... 81/57.4, 81/54, 52, 451
See application file for complete search history.

(56) References Cited

U.S. PATENT DOCUMENTS

| | | | | |
|---|---|---|---|---|
| 4,909,105 A | * | 3/1990 | Namiki et al. ................ | 81/57.36 |
| 5,332,181 A | * | 7/1994 | Schweizer et al. ........ | 248/123.11 |
| 6,973,856 B2 | * | 12/2005 | Shibata .......................... | 81/57.4 |
| 7,963,017 B2 | * | 6/2011 | Ehleiter et al. .................. | 81/57.4 |

FOREIGN PATENT DOCUMENTS

| | | |
|---|---|---|
| DE | 10 2006 026132 A1 | 6/2007 |
| JP | 60-034235 A | 2/1985 |
| JP | 62-181334 U | 11/1987 |
| JP | 01-071033 U | 5/1989 |
| JP | 1-71033 U | 5/1989 |
| JP | 5-72332 U | 5/1993 |
| JP | 06-190662 A | 7/1994 |
| JP | 08-277076 A | 10/1996 |
| JP | 10-058247 A | 3/1998 |
| JP | 2000-043768 A | 2/2000 |
| JP | 2002-120161 A | 4/2002 |
| JP | 2003-311555 A | 11/2003 |
| JP | 2004-291171 A | 10/2004 |
| JP | 2005-177910 A | 7/2005 |
| WO | 2007042149 A1 | 4/2007 |

\* cited by examiner

*Primary Examiner* — Hadi Shakeri
(74) *Attorney, Agent, or Firm* — Kenyon & Kenyon LLP (57) ABSTRACT

A screw fastener with simple configuration is provided, which automatically moves a rotary tool such as a nut runner to fastening positions to fasten screws, and the automation is achieved at low thrust. A screw fastener includes: X, Y, and Z-axis linear motion robots that move a nut runner along the directions of X, Y, and Z-axes, respectively, the axes being orthogonal to one another; a reaction force supporting member that supports a main body of the nut runner in a movable manner along each of the directions of the X, Y, and Z-axes and restricts the rotation of the main body around the rotary shaft; and positioning means that positions a body, and thus the screw fastener with simple configuration can automatically move the nut runner to positions to fasten screws, and achieves the automation at low thrust.

5 Claims, 4 Drawing Sheets

SCREW FASTENER

This is a 371 national phase application of PCT/JP2008/069028 filed 31 Oct. 2008, claiming priority to Japanese Patent Application No. JP 2007-291997 filed 9 Nov. 2007, the contents of which are incorporated herein by reference.

FIELD OF THE INVENTION

The present invention relates to a screw fastener that automatically moves a rotary tool such as a nut runner to fastening positions of a workpiece to fasten screws such as bolts and nuts into the workpiece, and achieves the automation at low thrust.

BACKGROUND OF THE INVENTION

Generally in automotive assembly lines, for improved efficiency in assembling, a rotary tool such as a nut runner is used to fasten screws such as bolts and nuts. The nut runner rotated by a motor achieves fastening of screws at high speed and generates a reaction force corresponding to the fastening torque of the screw, which needs to be supported. In the case where a suspension unit is secured to a vehicular body, a large torque is necessary for fastening, resulting in a large reaction force that cannot be supported by hands of an operator.

Patent Document 1 discloses a screw fastener including a nut runner that is freely movable, to a required extent, using movement of a slider, rotation of a parallel link, and up-down movement of an elevation plate, so that an operator can hold and move the main body of the nut runner in horizontal and vertical directions as desired. The reaction force of fastening torque from the nut runner is transmitted to the slider via the parallel link to reduce burden to the operator.
[Patent Document 1] Japanese Patent Application Publication No. JP-A-2005-177910

SUMMARY OF THE INVENTION

Problem to be Solved by the Invention

However, the invention of Patent Document 1 still requires at least one operator because the nut runner is manually moved to a fastening position by an operator, hindering reduction in manufacturing cost.

Therefore, automating the screw fastener of Patent Document 1 requires upgrading (increase in torque) of a drive motor that rotates the parallel link, so as to cope with the reaction force of fastening torque and the self weight. Thus, automation of the screw fastener cannot be easily achieved. The automation further requires a positioning unit that positions a vehicular body. As a result, the automation of the screw fastener according to the invention of Patent Document 1 is difficult to be achieved due to various problems including the increase in torque of a drive motor and the complicated structure.

Conventional automated screw fasteners are huge apparatuses enclosed by safety fences, and in the case of failure, the assembly line has to be stopped for a long time, increasing adverse effect on productive operation. Further, the apparatuses are not desirable because of their rather complicated structures that require a huge cost including an initial investment cost, man-hours for maintenance and maintenance and control cost.

The present invention was made in view of the above problems, and is directed to provide a screw fastener having a simple configuration that automatically moves a rotary tool such as a nut runner to fastening positions to fasten screws, and achieves the automation at low thrust.

The term "low thrust" used herein means thrust that is not so high as that for the conventional huge screw fasteners disposed in dedicated areas with safety fences, but that is suitable for general assembly lines for automotive industry with operators therearound and adopted for general-purpose, not special-purpose driving members.

Means for Solving the Problem

To solve the above problems, a screw fastener of the present invention is characterized by including: a rotary tool that has a rotary shaft and a main body in which to fasten a screw to a workpiece; a linear motion robot unit that is composed of an X-axis linear motion robot, a Y-axis linear motion robot, and a Z-axis linear motion robot, the X-axis linear motion robot, the Y-axis linear motion robot, and the Z-axis linear motion robot being connected with one another and the rotary tool along directions of the X, Y, and Z-axes, respectively, where the X, Y, and Z-axes each orthogonally cross; a supporting member that supports the main body of the rotary tool in a movable manner along each of the directions of the X, Y, and Z-axes and restricts rotation of the main body of the rotary tool around the rotary shaft so as to restrict the rotation of the main body around the rotary shaft; a reaction force supporting member that is composed of a parallel link that is disposed on a plane approximately orthogonal to the rotary shaft of the rotary tool and connects the main body of the rotary tool with the supporting member; a positioning means that positions the workpiece; and a floating table that is coupled to the linear motion robot unit and the positioning means and movable along a plane approximately orthogonal to the rotary shaft of the rotary tool.

This enables the operations of the screw fastener to be automated at low thrust.

Note that various forms of the screw fastener according to the present invention and their advantages will be described in the following Forms of the Invention.
Forms of the Invention Now, several forms of the present invention that are recognized as being claimable herein (hereinafter, may be referred to as the claimable invention, where appropriate) will be illustrated for description. The forms are itemized and numbered, and one of the items is described by referring to another item as needed, similar to the claims. This is for facilitating understanding of the claimable invention, and does not restrict the combinations of elements of the claimable invention to those described in the following items. That is, the claimable invention should be interpreted in view of the description in each item and embodiment, and according to such interpretation, a form with any additional element or removed element can be a form of the claimable invention. In the following items, items (1) to (5) correspond to claims 1, 2, 4, 5, and 3, respectively.

(1) A screw fastener characterized by including: a rotary tool that has a rotary shaft and a main body in which to fasten a screw to a workpiece, a linear motion robot unit that is composed of an X-axis linear motion robot, a Y-axis linear motion robot, and a Z-axis linear motion robot, the X-axis linear motion robot, the Y-axis linear motion robot, and the Z-axis linear motion robot being connected with each other and moving the rotary tool along directions of the X, Y, and Z-axes, respectively, where the X, Y, and Z-axes each orthogonally cross; a supporting member that supports the main body of the rotary tool in a movable manner along each of the directions of the X, Y, and Z-axes and restricts rotation of the main body of the rotary tool around the rotary shaft so as to restrict the rotation of the main body around the rotary shaft; a reaction force supporting member that is composed of a parallel link that is disposed on a plane approximately orthogonal to the rotary shaft of the rotary tool and connects the main body of the rotary tool with the supporting member; a positioning means that positions the workpiece; and a floating table that is coupled to the linear motion robot unit and the positioning means and movable along a plane approximately orthogonal to the rotary shaft of the rotary tool.

In the screw fastener according to the item (1), a workpiece is positioned by the positioning means, and then the rotary tool such as a nut runner is automatically moved to the workpiece by the X-axis linear motion robot, the Y-axis linear motion robot, and the Z-axis linear motion robot along the directions of the X, Y, and Z-axes, respectively, to fasten screws such as bolts and nuts into the workpiece. The reaction force supporting member supports the reaction force of a fastening torque of the rotary tool, preventing any adverse effect of the reaction force of the fastening torque on each of the X, Y, and Z-axis linear motion robots. This allows the use of general-purpose X, Y, and Z-axis linear motion robots that are driven at low thrust. Further, the reaction force of the fastening torque (rotation force around the rotary shaft) is transmitted to the supporting member from the main body of the rotary tool via the parallel link, and supported by the supporting member. Furthermore, the parallel link provided between the rotary tool and the supporting member significantly reduces the rotation force (load) applied to the main body of the rotary tool before the rotation force is transmitted to the supporting member. Still further, even if only one of the X-axis linear motion robot, the Y-axis linear motion robot, and the Z-axis linear motion robot is coupled to the main body of the rotary tool, the rotary tool can be automatically moved along the directions of the X, Y, and Z-axes by the X-axis linear motion robot, the Y-axis linear motion robot, and the Z-axis linear motion robot, respectively, resulting in the simple structure of the screw fastener. Moreover, the floating table absorbs small vibrations of a workpiece particularly after the workpiece is positioned by the positioning means.

(2) The screw fastener according to the item (1), characterized in that the linear motion robot unit is removably coupled to the rotary tool.

In the screw fastener according to the item (2), when one of the X-axis linear motion robot, the Y-axis linear motion robot, and the Z-axis linear motion robot becomes inoperable due to failure or the like, an operator can decouple the linear motion robot unit from the rotary tool, so that the operator can hold the main body of the rotary tool and move it to fastening positions serially to fasten screws. In this case also, the reaction force of the fastening torque generated by the screw fastening is supported by the reaction force supporting member, and thus, is not applied to the operator. This facilitates the screw fastening operation.

(3) The screw fastener according to the item (1) or (2), characterized in that the linear motion robot unit is removably coupled to a lower end of a rod that is coupled to the main body and extends in the axial direction of the rotary shaft, and the parallel link that is movable along a plane approximately orthogonal to the rotary shaft is fixed to a guide member that slidably supports the rod in the axial direction of the rotary shaft.

In the screw fastener according to the item (3), with a simple structure, the reaction force supporting member for supporting the reaction force of fastening torque allows the movement of the rotary tool operated by the linear motion robot unit in the directions of the X, Y, and Z-axes.

(4) The screw fastener according to any one of the items (1) to (3), characterized in that the positioning means is composed of a plurality of engagement pin units that automatically advance/retract engagement pins in the axial direction of the rotary shaft of the rotary tool to engage the engagement pins with a workpiece or a member around the workpiece.

In the screw fastener according to the item (4), precise alignment of a workpiece relative to the floating table is assured.

(5) The screw fastener according to any one of the items (1) to (4), characterized in that the rotary tool, the X-axis linear motion robot, the Y-axis linear motion robot, the Z-axis linear motion robot, the reaction force supporting member, and the positioning means are provided to a fastening carriage that runs in synchronization with the workpiece.

The screw fastener according to the item (5) is very effective for screw fastening operations on a workpiece that is conveyed hanging on a hanger of an overhead conveyer running at a constant speed.

Effects of the Invention

According to the present invention, a screw fastener of a simple configuration can be provided, which can automatically move a rotary tool such as a nut runner to fastening positions to fasten screws and can achieve the automation at low thrust.

DESCRIPTION OF THE REFERENCE NUMERALS 1 screw fastener, 2 body (workpiece), 3 hanger, 4 nut runner (rotary tool), 5 main body, 6 rotary shaft, 7 fastening carriage, 8 X-axis linear motion robot, 9 Y-axis linear motion robot, 10 Z-axis linear motion robot, 11 linear motion robot unit, 15 reaction force supporting member, 16 positioning means, 20 main body plate, 21 slider (supporting member), 22 parallel link, 22a, 22b link, 25 guide rail, 29 engagement block, 40 coupling plate, 41 elevation rod, 42 guide member, 50 floating table, 51 body-side engagement pin unit (positioning means), 52 hanger-side engagement pin unit (positioning means), 57 hanger-side engagement pin, 58 body-side engagement pin

DETAILED DESCRIPTION

Now, a best mode for carrying out the present invention will be described below in detail with reference to FIGS. 1 to 4.

Figure 1:
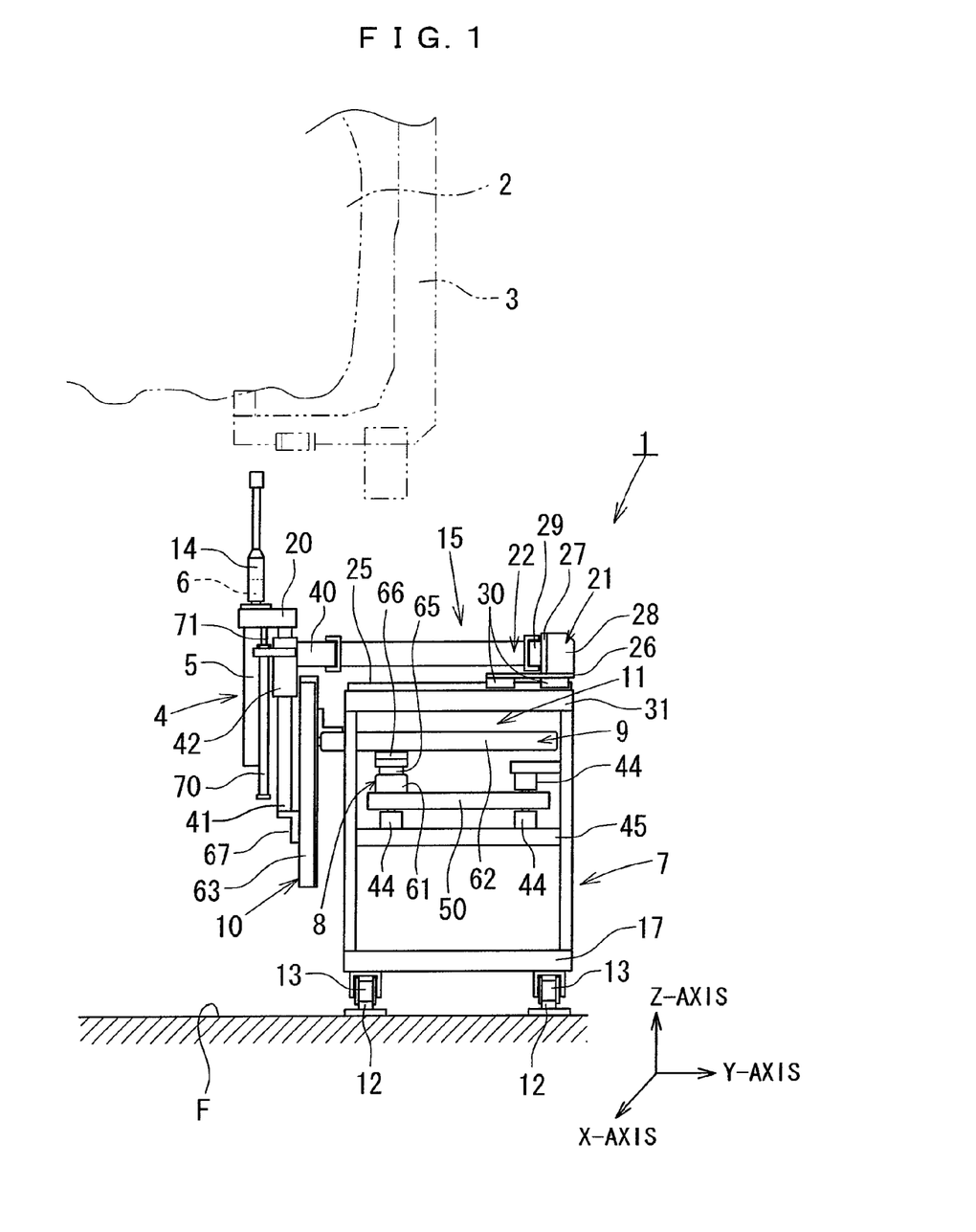
FIG. 1 is a front view of a screw fastener of an embodiment of the present invention, from the direction of the X-axis.

A screw fastener 1 according to an embodiment of the present invention is used in an automobile assembly line to fasten screws such as bolts and nuts into a vehicular body 2 (workpiece) from underneath thereof to assemble a component to the body 2, as illustrated in FIG. 1, the body 2 being conveyed hanging on a hanger 3 of an overhead conveyer continuously running at a constant speed.

Figure 2:
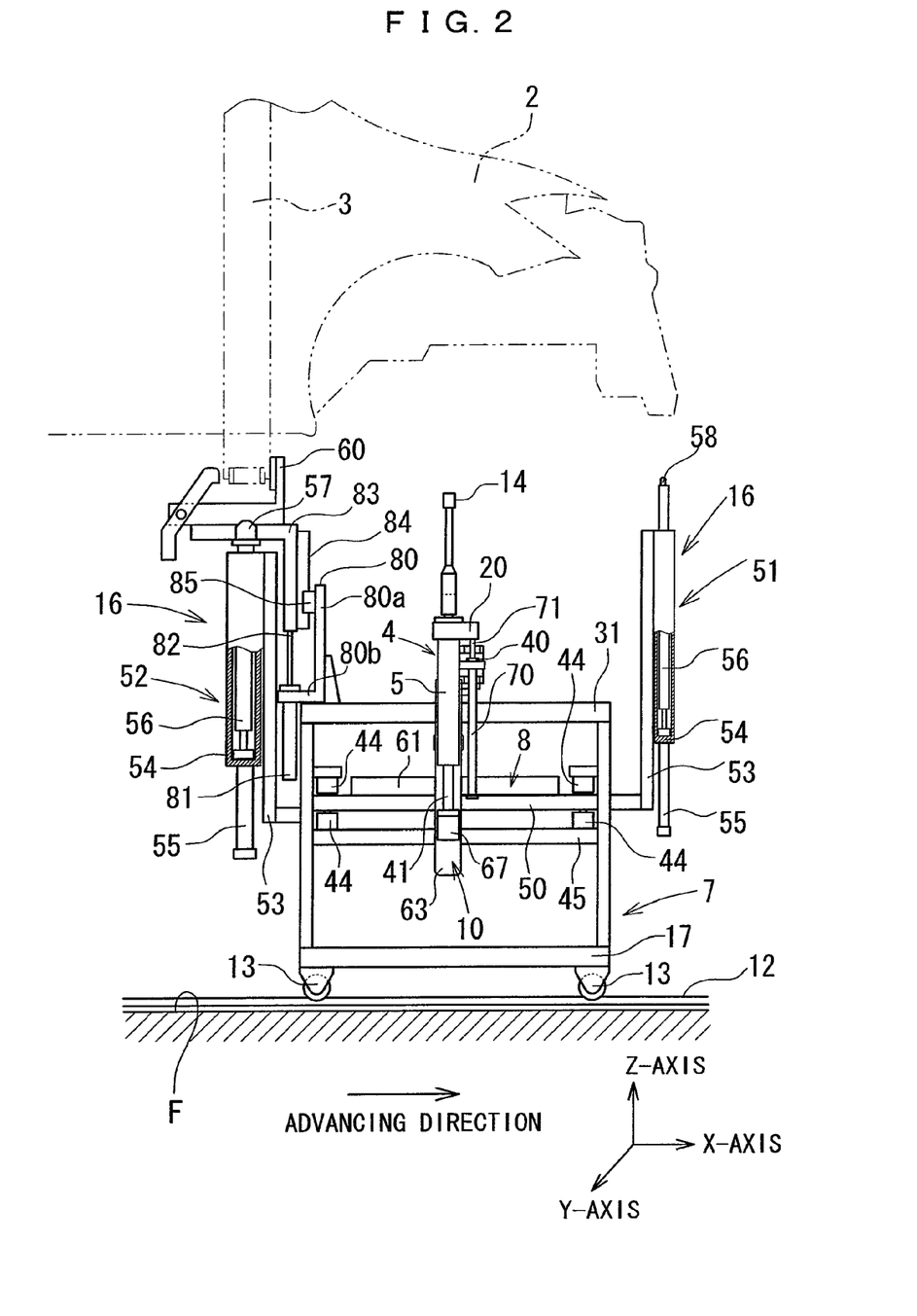
FIG. 2 is a side view of the screw fastener from the direction of the Y-axis.
Figure 3:
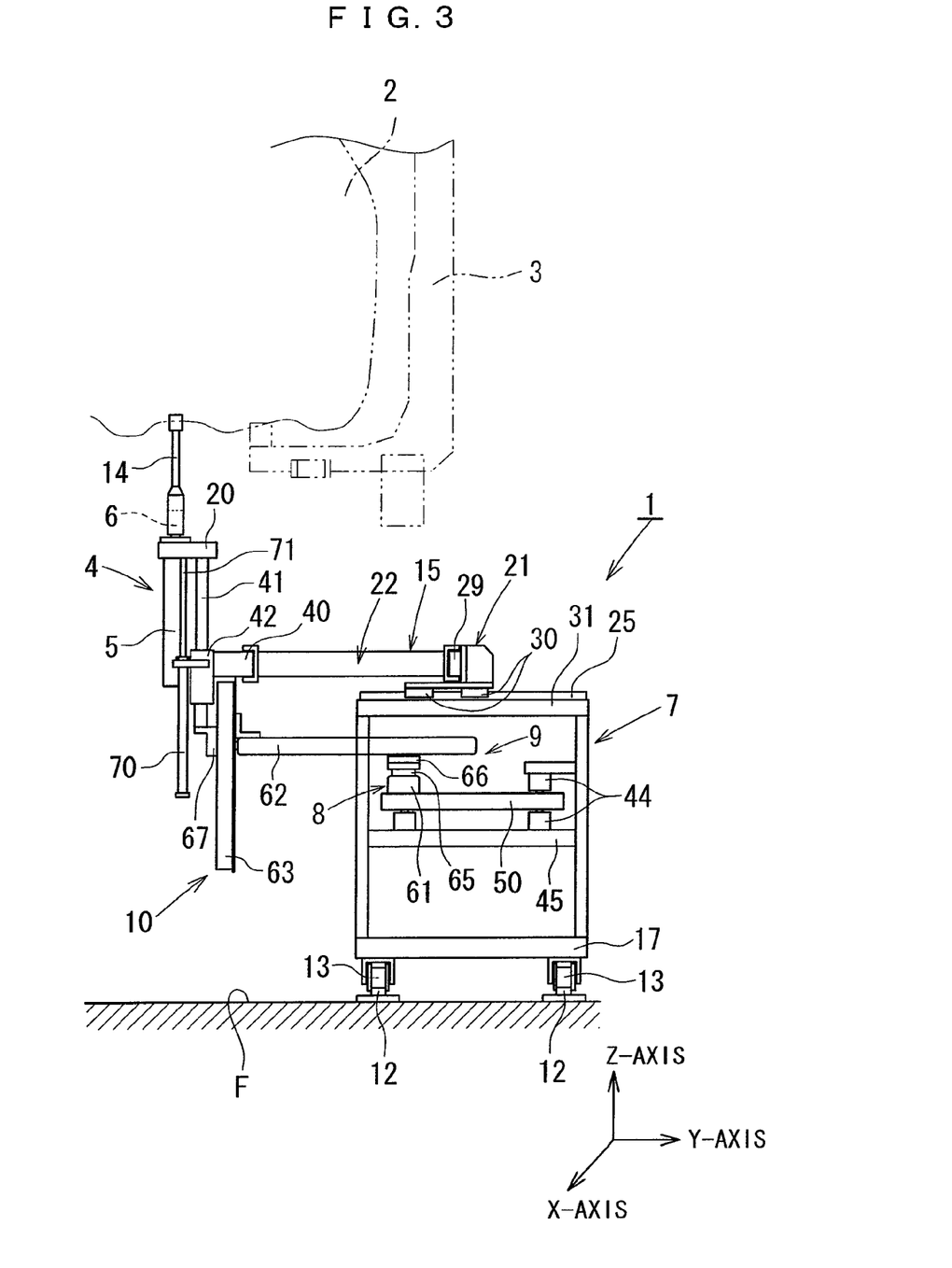
FIG. 3 is a front view of the screw fastener from the direction of the X-axis, after a nut runner is moved to a fastening position.

As illustrated in FIGS. 1 to 3, the screw fastener 1 includes: a nut runner (rotary tool) 4 having a rotary shaft 6 and a main body 5 for fastening screws to the body 2; X, Y, and Z-axis linear motion robots 8, 9, and 10 that move the nut runner 4 along the directions of X, Y, and Z-axes, respectively, the axes being orthogonal to one another; a reaction force supporting member 15 that supports the main body 5 of the nut runner 4 in a movable manner along each of the directions of the X, Y, and Z-axes and restricts the rotation of the main body 5 around the rotary shaft 6; positioning means 16 that positions the body 2; and a fastening carriage 7 having the nut runner 4, the X, Y, and Z-axis linear motion robots 8, 9, and 10, the reaction force supporting member 15, and the positioning means 16 mounted thereon, and running in synchronization with the hanger 3 on a pair of rails 12, 12 provided on a floor F.

In this embodiment, in FIG. 1, the direction of the X-axis is orthogonal to the plane of FIG. 1, the direction of the Y-axis is a lateral direction in FIG. 1, the direction of the X-axis is a vertical direction in FIG. 1.

The pair of rails 12, 12 are provided on the floor F on the right and left sides of the transfer line of the hanger 3 (in the direction of the X-axis) for transferring the body 2. The fastening carriage 7 has four wheels 13 each at corners on the lower surface of a bottom plate 17 thereof, and is movable along the rails 12 using the wheels 13. The fastening carriage 7 further has a synchronization device, so that the fastening carriage 7 can follow the transfer of the body 2 by the hanger 3 within a predetermined operation zone, and can return to the home position after screwing operations are completed. The synchronization device may, in an operation zone, mechanically couple the fastening carriage 7 to the hanger 3, or electrically couple the fastening carriage 7 to the hanger 3 using driving means provided on the fastening carriage 7.

The nut runner 4 including the main body 5 and the rotary shaft 6 is a uniaxial nut runner that fastens bolts and nuts using the torque of the rotary shaft 6 transmitted from an electric motor in the main body 5. The nut runner 4 is controlled so that, once it is moved to a position for fastening, the rotary shaft 6 is automatically rotation driven at a rotational speed and a fastening torque that are appropriately controlled by servo means. In addition, by replacing a socket 14 fitted in the rotary shaft 6, bolts and nuts of different dimensions can be fastened.

A main body plate 20 extending in the direction of the Y-axis is fixed at the top portion of the main body 5 of the nut runner 4. The main body plate 20 is secured to an upper end of an elevation rod 41 which will be described later, and is connected to an upper surface of a balance rod (cylinder rod) 71 extending from an air cylinder 70.

Figure 4:
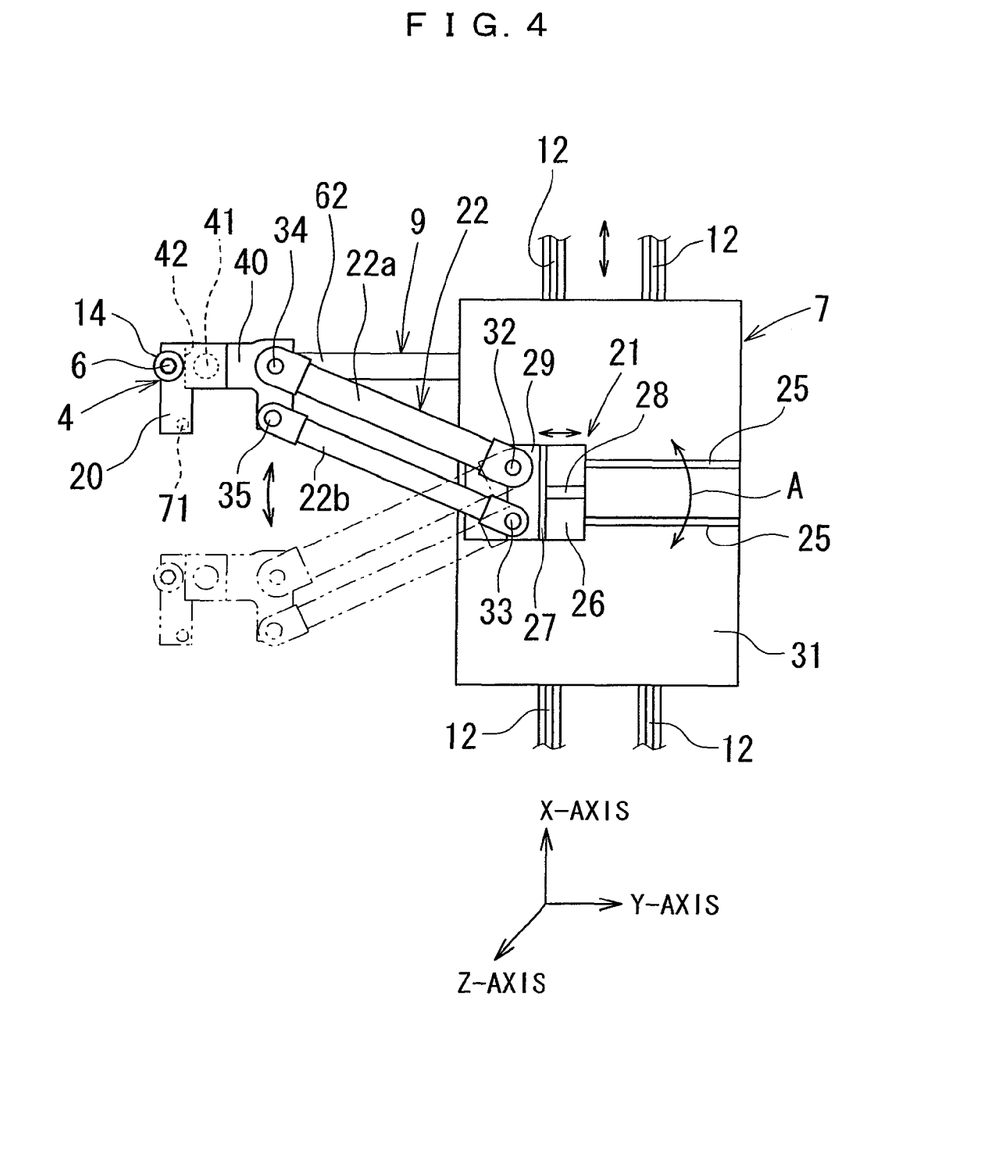
FIG. 4 is a top view of a screw fastener of the embodiment of the present invention, from the direction of the Z-axis.

As illustrated in FIGS. 1 and 4, the reaction force supporting member 15 is configured with: a slider 21 (supporting member) that restricts the rotation of the main body 5 of the nut runner 4 around the rotary shaft 6 (in the A direction in FIG. 4); and a parallel link 22 that is disposed on a plane (X-Y plane) approximately orthogonal to the rotary shaft 6 of the nut runner 4 and connects the main body 5 of the nut runner 4 to the slider 21.

The fastening carriage 7 has a top panel 31, as illustrated in FIG. 4, on which a pair of guide rails 25, 25 are provided parallel to the floor F and extending in the direction (the direction of the Y-axis) that is orthogonal to the running direction of the fastening carriage 7 (the direction of the X-axis).

As illustrated in FIGS. 1 and 4, the slider 21 is configured with a bottom panel 26, a vertical panel 27 in the direction orthogonal to the guide rails 25 (the direction of the X-axis), a reinforcing rib 28 extending from one side surface of the vertical panel 27, and an engagement block 29 that projects out from another side surface of the vertical panel 27 to be engaged with the parallel link 22. To the bottom panel 26 of the slider 21, two pairs of slide blocks 30 are fixed to slide along the guide rails 25.

The slider 21 is slidably supported on the top panel 31 of the fastening carriage 7 by the guide rails 25 in the direction (the direction of the Y-axis) orthogonal to the running direction of the fastening carriage 7, and is also restricted from rotating around the rotary shaft 6 of the main body 5 of the nut runner 4 by the guide rails 25.

As illustrated in FIG. 4, the parallel link 22 is disposed on the plane (X-Y plane) approximately orthogonal to the rotary shaft 6 of the nut runner 4, and is configured with a pair of parallel links 22a and 22b of an identical length. The proximal ends of the links 22a and 22b are pivotably coupled to the engagement block 29 of the slider 21 by pins 32 and 33, respectively. The distal ends of the links 22a and 22b are pivotably coupled to one end of the coupling plate 40 by pins 34 and 35, respectively. The other end of the coupling plate 40 is secured to a guide member 42 that supports the elevation rod 41 in a manner movable upward and downward (movable in the direction of the Z-axis) which will be described later, as illustrated in FIG. 1.

As illustrated in FIGS. 1 to 3, to the lower surface of the main body plate 20 that extends from the main body 5 of the nut runner 4, the top end of the elevation rod 41 is secured. The elevation rod 41 is supported by the guide member 42 in a manner movable upward and downward (movable in the direction of the Z-axis). To the guide member 42, the other end of the coupling plate 40 is secured, the coupling plate 40 pivotably supporting the links 22a and 22b of the parallel link 22. Alternatively, a ball spline structure may be used between the guide member 42 and the elevation rod 41 to allow the vertical movement of the elevation rod 41 (in the direction of the Z-axis) and restrict the axial rotation of the elevation rod 41. The lower end of the elevation rod 41 is removably coupled to a Z-axis robot coupling portion 67 of the Z-axis linear motion robot 10 that constitutes a linear motion robot unit 11 which will be described later.

Based on the above described support of the nut runner 4 by the reaction force supporting member 15: i.e., since the elevation rod 41 coupled to the main body 5 of the nut runner 4 using the main body plate 20 is supported by the guide member 42 in a manner movable upward and downward (movable in the direction of the Z-axis), and the guide member 42 is pivotably supported by the parallel link 22 around the engagement block 29 of the slider 21 (movable in the direction of the X-axis), as well as the parallel link 22 is movably supported by the slider 21 in the direction orthogonal to the running direction of the fastening carriage 7 (in the direction of the Y-axis), the nut runner 4 is supported by the fastening carriage 7 in a manner movable along each of the directions of the X, Y, and Z-axes, with the main body 5 thereof being restricted from rotating around the rotary shaft 6.

The screw fastener 1 further includes, as illustrated in FIGS. 1 and 3, an air cylinder 70 that is disposed near the elevation rod 41 vertically to balance the main body plate 20 in the vertical direction, the plate 20 extending from the main body 5 of the nut runner 4. The air cylinder 70 includes a main body that is supported by the guide member 42 at the top portion thereof.

The balance rod (cylinder rod) 71 extending from the air cylinder 70 is connected, at the top surface thereof, to the lower surface of the main body plate 20 extending from the main body 5 of the nut runner 4.

As illustrated in FIGS. 1 to 3, an intermediate panel 45 disposed approximately in the middle of the fastening carriage 7 in the vertical direction is provided with four pairs of vertically-arranged ball rollers 44, 44 at the four corners thereof respectively. Between each pair of the vertically-arranged ball rollers 44, 44, a floating table 50 is interposed to be movable along a plane (X-Y plane) approximately orthogonal to the rotary shaft 6 of the nut runner 4.

As illustrated in FIG. 2, to the both ends of the floating table 50 in the running direction of the fastening carriage 7 (the direction of the X-axis), a body-side engagement pin unit 51 and a hanger-side engagement pin unit 52 serving as the positioning means 16 of the body 2 are secured using mount brackets 53, 53, respectively. The body-side engagement pin unit 51 is provided to the front side in the advancing direction of the fastening carriage 7, whereas the hanger-side engagement pin unit 52 is provided to the rear side in the advancing direction of the fastening carriage 7.

The hanger-side engagement pin unit 52 is configured with: a cylindrical engagement block 54 that is secured to the mount bracket 53 and supports an air cylinder 55; a rod 56 that is supported by the engagement block 54 in a manner movable upward and downward (movable in the direction of the Z-axis) and is coupled with a cylinder rod extending from the air cylinder 55; and a hanger-side engagement pin 57 integrally formed with the upper end of the rod 56.

The body-side engagement pin unit 51 basically has the same configuration as that of the hanger-side engagement pin unit 52, except that the elements thereof each have a slightly smaller diameter than those of the elements in the hanger-side engagement pin unit 52, because a body-side engagement pin 58 at the top end of the unit 51 is formed to have a diameter smaller than that of the hanger-side engagement pin 57.

As illustrated in FIG. 2, the fastening carriage 7 includes a hanger synchronization bar 60. To the top panel 31 of the fastening carriage 7, at the rear end thereof in the advancing direction of the fastening carriage 7 (in the direction of the X-axis), an L-shaped mount bracket 80 is fixedly attached with a reinforcing rib. The mount bracket 80 includes a horizontal portion 80b that supports a synchronization bar elevation cylinder 81. The synchronization bar elevation cylinder 81 has a cylinder rod 82 extending therefrom that is coupled to the hanger synchronization bar 60 using an L-shaped coupling member 83. The coupling member 83 is provided with a guide rail 84 on the mount bracket 80 side thereof, and the guide rail 84 is engaged with a guide 85 that is disposed on a vertical portion 80a of the mount bracket 80 in a manner movable upward and downward.

When the fastening carriage 7 starts to run in a predetermined operation zone, the hanger synchronization bar 60 moves upward from the fastening carriage 7 to be engaged with the hanger 3 such that the front surface of the hanger 3 in the advancing direction is caught by the hanger synchronization bar 60. At the engagement, a hanger-side engagement pin 57 of the hanger-side engagement pin unit 52 is engaged in a downwardly opening engagement hole of the hanger synchronization bar 60 (coupling member 83).

As illustrated in FIGS. 1 to 3, the linear motion robot unit 11 is secured to the floating table 50, the unit 11 being composed of the X, Y, and Z-axis linear motion robots 8, 9, and 10 that are coupled to one another. The X, Y, and Z-axis linear motion robots 8, 9, and 10 are respectively configured with an X-axis robot main body 61 and an X-axis robot coupling portion 65 projecting out from one surface of the X-axis robot main body 61, a Y-axis robot main body 62 and a Y-axis robot coupling portion 66 projecting out from one surface of the Y-axis robot main body 62, and a Z-axis robot main body 63 and a Z-axis robot coupling portion 67 projecting out from one surface of the Z-axis robot main body 63, the portions 61 to 63 each being a rod member of a rectangular cross section.

Specifically, as illustrated in FIGS. 1 and 2, the X-axis robot main body 61 of the X-axis linear motion robot 8 is secured to the floating table 50 along the direction of the X-axis at one end of the floating table 50 in the direction of the Y-axis, and the X-axis robot coupling portion 65 projecting out from the top surface of the X-axis robot main body 61 is coupled to the Y-axis robot coupling portion 66 projecting out from the bottom surface of the Y-axis robot main body 62 of the Y-axis linear motion robot 9 disposed along direction of the Y-axis. The Y-axis robot main body 62 of the Y-axis linear motion robot 9 is coupled, at one end thereof in the direction of the Y-axis, to one surface of the Z-axis robot main body 63 that is disposed at a position outside the fastening carriage 7 of the Z-axis linear motion robot 10 along the direction of the Z-axis. The Z-axis robot coupling portion 67 projecting out from the surface of the Z-axis robot main body 63 opposite to the surface that is coupled to the Y-axis robot main body 62 is removably coupled with the lower end of the elevation rod 41 coupled to the nut runner 4, using a coupling pin for example.

When the nut runner 4 is moved along each of the directions of the X, Y, and Z-axes to a specified fastening position, first, the X-axis robot coupling portion 61 of the X-axis linear motion robot 8 slides along the direction of the X-axis, and the Y-axis linear motion robot 9 and the Z-axis linear motion robot 10 move along the direction of the X-axis to a set position in the direction of the X-axis. Then, the Y-axis robot main body 62 of the Y-axis linear motion robot 9 slides along the direction of the Y-axis with reference to the Y-axis robot coupling portion 66, and the Z-axis linear motion robot 10 moves along the direction of the Y-axis to a set position in the direction of the Y-axis. Subsequently, the Z-axis robot coupling portion 67 of the Z-axis linear motion robot 10 slides along the direction of the Z-axis, and the elevation rod 41 moves along the direction of the Z-axis to a set position in the direction of the Z-axis, so that the nut runner 4 reaches the specified fastening position.

The X, Y, and Z-axis linear motion robots 8, 9, and 10 are provided with teaching in advance, for operations after the floating table 50 is positioned relative to the body 2.

As described above, the nut runner 4 is supported by the fastening carriage 7 in a manner movable along each of the directions of the X, Y, and Z-axes using the reaction force supporting member 15, and thus the reaction force supporting member 15 does not restrict the movement of the nut runner 4 along the direction of the X-axis using the X-axis linear motion robot 8, along the direction of Y-axis using the Y-axis linear motion robot 9, and along the direction of Z-axis using the Z-axis linear motion robot 10.

Next, operations of the screw fastener 1 of the embodiment of the present invention will be described below.

When the body 2 with temporarily-assembled components is transferred into a predetermined operation zone, hanging on the hanger 3, the fastening carriage 7 of the screw fastener 1 installed in the operation zone is synchronized with the body 2 and runs on the rails 12, 12.

The hanger synchronization bar 60 is lifted upward from the fastening carriage 7 to be attached to the hanger 3 so as to catch the front surface of the hanger 3.

Then, the body-side engagement pin 58 of the body-side engagement pin unit 51 and the hanger-side engagement pin 57 of the hanger-side engagement pin unit 52, both units 51 and 52 being secured to the floating table 50, are lifted upward to be inserted through and engaged with an engagement hole in the body 2 and an engagement hole in the hanger synchronization bar 60 (coupling member 83), respectively.

The floating table 50 is disposed in advance at a predetermined position where the body-side engagement pin 58 and the hanger-side engagement pin 57 can be inserted through an engagement hole in the body 2 and an engagement hole in the hanger synchronization bar 60 (coupling member 83), respectively, on a plane (X-Y plane) that is approximately orthogonal to the rotary shaft 6. The floating table 50 is constantly movable along the X-Y plane to absorb small vibrations of the body 2 and small vibrations in screw fastening.

Since the floating table 50 is constantly movable along the X-Y plane, an operator can finely adjust the position of the body-side engagement pin unit 51 on the X-Y plane to insert the body-side engagement pin 58 in an engagement hole of the body 2, if the body-side engagement pin 58 of the body-side engagement pin unit 51 cannot be inserted in an engagement hole in the body 2, for example.

After the body 2 is positioned relative to the floating table 50, the X, Y, and Z-axis linear motion robots 8, 9, and 10 are driven based on the contents of the teaching that are set in advance, so that the nut runner 4 automatically moves along each of the directions of the X, Y, and Z-axes to a specified position for fastening, as described above. Then, the rotary shaft 6 of the nut runner 4 is driven to fasten a screw. In the movement of the nut runner 4 to the specified position for fastening, the Z-axis linear motion robot 10 is operated, and the air cylinder 70 is also operated as the elevation rod 41 moves upward and downward, so that the upward and downward movement of the balance rod 71 keeps the balance of the main body plate 20 in the vertical direction.

After fastening at all of the fastening positions by repeating the above described operations, the body-side engagement pin 58 of the body-side engagement pin unit 51 and the hanger-side engagement pin 57 of the hanger-side engagement pin unit 52 are lowered, so that the positioning of the body 2 relative to the floating table 50 is released. At the same time, the X, Y, and Z-axis linear motion robots 8, 9, and 10 each return to home positions illustrated in FIG. 1, and the fastening carriage 7 returns to a running start position in the predetermined operation zone.

In fastening a screw using the nut runner 4, the reaction force of the fastening torque is applied to the main body 5 of the nut runner 4 as a torque in the direction opposite to the rotation direction of the rotary shaft 6, and transmitted from the main body 5 to the coupling plate 40 via the main body plate 20 and the elevation rod 41. The reaction force of the fastening torque transmitted to the coupling plate 40 is further transmitted to the slider 21 via the link elements 22a and 22b of the parallel link 22. The torque (load), which is transmitted to the slider 21 from the main body 5 of the nut runner 4 via the link elements 22a and 22b of the parallel link 22, is significantly reduced compared to the torque applied to the main body 5 of the nut runner 4.

The reaction force of the fastening torque transmitted to the slider 21 is further transmitted to the fastening carriage 7 via the guide rails 25, and received by the fastening carriage 7 supported by the rails 12. The pair of rails 12 and the front and rear wheels 13 of the fastening carriage 7 may be each separated by a sufficient distance to reduce the force applied onto each of the wheels 13.

In the screw fastener 1 of an embodiment of the present invention, in the case of malfunction of the X-axis linear motion robot 8, the Y-axis linear motion robot 9, or the Z-axis linear motion robot 10 for some reason during operation, the Z-axis robot coupling portion 67 of the Z-axis linear motion robot 10 is decoupled from the lower end of the elevation rod 41 and the nut runner 4 is decoupled from the linear motion robot unit 11, so that an operator can hold the main body 5 of the nut runner 4 and move it to fastening positions serially to fasten screws.

In this case also, the reaction force of the fastening torque in screw fastening is supported by the reaction force supporting member 15, preventing the application of the reaction force of the fastening torque to the operator, and facilitating the fastening operation.

As described above, the screw fastener 1 of the embodiment of the present invention uses the X, Y, and Z-axis linear motion robots 8, 9, and 10 that automatically move the nut runner 4 along each of the directions of the X, Y, and Z-axes, which achieves automation at low thrust and simple structure.

The screw fastener 1 does not require a dedicated space surrounded by safety fences as in the conventional huge automated screw fastener, resulting in a significant reduction in the length of an assembly line. Further, the automation of the screw fastener 1 can be achieved at low thrust, which secures safety when operators are working around the assembly line.

The screw fastener 1 can be installed in the assembly line around which operators are working. As a result, in the case of failure in fastening, an operator can quickly cover the failed operation, whereas in the case of malfunction of the X-axis linear motion robot 8, the Y-axis linear motion robot 9, or the Z-axis linear motion robot 10, the linear motion robot unit 11 can be easily decoupled from the nut runner 4 so that the operation is switched to manual operation. This allows the fastening operations to be continued without stopping the assembly line.

In addition, the screw fastener 1 can be used for different vehicle types or different fastening positions by changing the contents of teaching of the X, Y, and Z-axis linear motion robots 8, 9, and 10, without any change in the structure or the like thereof, which provides versatility and practicability to the screw fastener 1.

The invention claimed is:
1. A screw fastener, comprising:
a rotary tool that has a rotary shaft and a main body in which to fasten a screw to a workpiece;
a linear motion robot unit that is composed of an X-axis linear motion robot, a Y-axis linear motion robot, and a Z-axis linear motion robot, the X-axis linear motion robot, the Y-axis linear motion robot, and the Z-axis linear motion robot being connected with one another and moving the rotary tool along directions of the X, Y and Z-axes, respectively, where the X, Y, and Z-axes each orthogonally cross;
a supporting member that supports the main body of the rotary tool in a movable manner along each of the directions of the X, Y, and Z-axes and restricts rotation of the main body of the rotary tool around the rotary shaft so as to restrict the rotation of the main body around the rotary shaft;
a reaction force supporting member that is composed of a parallel link that is disposed on a plane approximately orthogonal to the rotary shaft of the rotary tool and connects the main body of the rotary tool with the supporting member;
a positioning device that positions the workpiece; and a floating table that is coupled to the linear motion robot unit and the positioning device and movable along a plane approximately orthogonal to the rotary shaft of the rotary tool.

2. The screw fastener according to claim 1, wherein the linear motion robot unit is removably coupled to the rotary tool.

3. The screw fastener according to claim 1, wherein the rotary tool, the X-axis linear motion robot, the Y-axis linear motion robot, the Z-axis linear motion robot, the reaction force supporting member, and the positioning device are provided to a fastening carriage that runs in synchronization with the workpiece.

4. The screw fastener according to claim 1, wherein the linear motion robot unit is removably coupled to a lower end of a rod that is coupled to the main body of the rotary tool and extends in the axial direction of the rotary shaft, and the parallel link that is movable along a plane approximately orthogonal to the rotary shaft is fixed to a guide member that slidably supports the rod in the axial direction of the rotary shaft.

5. The screw fastener according to claim 1, wherein the positioning device is composed of a plurality of engagement pin units that automatically advance/retract engagement pins in the axial direction of the rotary shaft of the rotary tool to engage the engagement pins with a workpiece or a member around the workpiece.

* * * * *

UNITED STATES PATENT AND TRADEMARK OFFICE
CERTIFICATE OF CORRECTION

| | |
|---|---|
| PATENT NO. | : 8,272,296 B2 |
| APPLICATION NO. | : 12/741948 |
| DATED | : September 25, 2012 |
| INVENTOR(S) | : Shinji Tohyama et al. |

It is certified that error appears in the above-identified patent and that said Letters Patent is hereby corrected as shown below:

In the Specifications

Column 1, line 4, change "filed 31 Oct 2008" to --filed 21 Oct 2008--.

Signed and Sealed this
Seventh Day of May, 2013

Teresa Stanek Rea
*Acting Director of the United States Patent and Trademark Office*